J. W. Lawson,

Upsetting Tires,

N⁰ 35,695.    Patented June 24, 1862.

Witnesses:
Ed. G. Witkin
J. D. Zooker

Inventor:
Joseph W Lawson

UNITED STATES PATENT OFFICE.

JOSEPH W. LAWSON, OF ANN ARBOR, MICHIGAN.

IMPROVEMENT IN MACHINES FOR UPSETTING TIRES.

Specification forming part of Letters Patent No. 35,695, dated June 24, 1862.

*To all whom it may concern:*

Be it known that I, JOSEPH W. LAWSON, of the city of Ann Arbor, in the county of Washtenaw and State of Michigan, have invented a new and useful Machine for Upsetting Tires; and I do hereby declare that the following is a full, clear, and exact description of the construction and operation of the same, reference being had to the accompanying drawings, making a part of this specification, in which—

Figure 1:
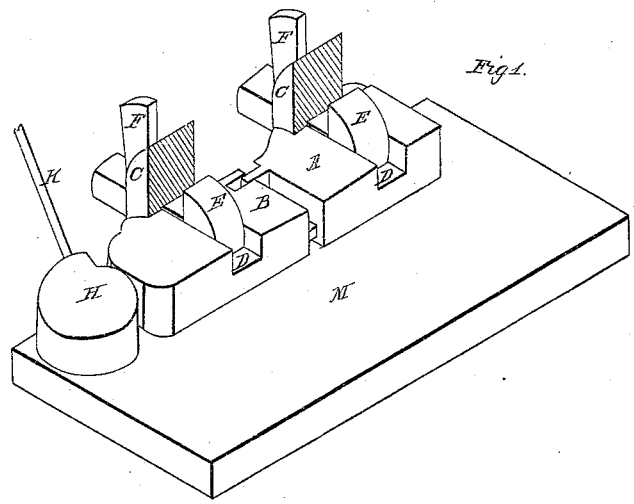
Figure 2:
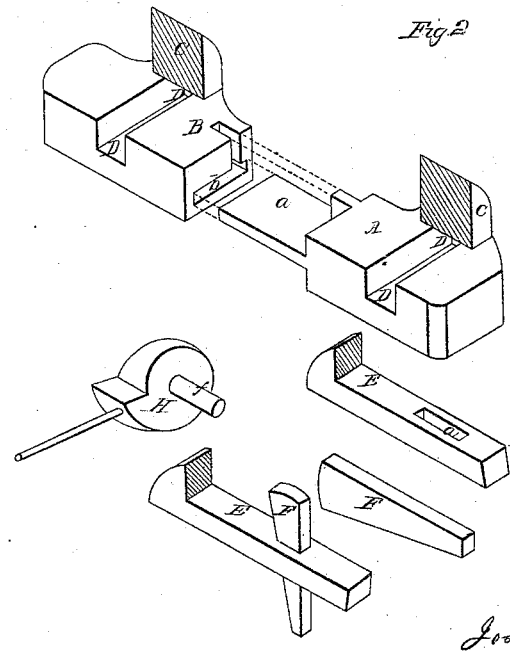

Figure 1 is a perspective view of the entire machine; and Fig. 2 is a perspective view of the component parts, in which latter figure A is a stationary bed-piece of cast-iron; *a*, a tongue; B, a sliding bed-piece of cast-iron; *b*, a groove. C C are flanges or jaws cast with the bed-pieces. D D are holes through the flanges, of a size corresponding with the slots D D. E E are sliding jaws, of wrought-iron, and *d* a mortise through the outer end of each jaw. F F are wedge-shaped keys passing through the mortise *d*. H is a cam with a pin, *f*, on which it may turn when moved by the lever K.

The nature of my invention consists in arranging the above component parts in such a way that when the tire is heated sufficiently and placed in the machine it may, by turning the cam, be pressed together or upset, thereby saving the labor and cost of cutting out a piece and welding anew.

To enable others skilled in the art to make and use my invention, I will proceed to describe its construction and operation.

I first make of cast-iron (of a size sufficient to accomplish the desired work) two bed-pieces, A B, the one farthest from the cam, hereinafter described, with a tongue, *a*, at the end, the other with a corresponding groove, *b*, made to receive the tongue *a*. Each bed-piece has, when first made, cast on one side a flange or jaw, C, at a short distance from the end. Of these two bed-pieces, A is attached firmly to a bench or block, *m*, in Fig. 1, by being let down into the block. B is also let into the block, the space being cut long enough to allow the sliding bed-piece B to move back and forth on the tongue *a* endwise one or two inches. The upper surfaces of the bed-pieces are slightly concave, so that all the pressure from the tire shall be downward. The flanges C C rise above the surface of the bed-pieces one and one-half inch or more, and have their faces toward the bed-pieces fluted, in order to prevent anything slipping when held between them and the sliding jaws E E. Through the center of each flange is left a square hole, (marked D D in Fig. 2,) which is one and one-half or more inches square. Across each bed-plate, opposite the above holes, is also left a slot of the same size, also marked D D. In these slots and holes are fitted sliding jaws E E, made of wrought-iron, having the faces toward the flanges fluted in the same manner and for the same purpose. Through the outer end of each sliding jaw is cut a mortise. (Shown in Fig. 2 by the letter *d*.) Wedge-shaped keys F F are then made, which, when the sliding jaws E E are placed in the slots D D and through the holes D D, may be driven through this mortise on the outside of the flanges, so that when the tire is placed on the bed-pieces between the jaws C C and E E, by driving down the keys F F the jaws are drawn nearer together, thus holding whatever is between them firmly without slipping. H is a cam of cast or wrought iron, pivoted by a pin, *f*, to the block or bench at the end of the sliding bed-piece B. This cam is moved by the lever K, of wrought-iron. The least radius of the cam is now turned toward the end of the sliding bed-piece, which is pulled back until in contact with the cam. The tire is then heated sufficiently, and secured by its edges, or flatwise, as may be necessary, as above described. The cam is then turned to the right by means of the lever K, which presses the sliding bed-piece on the guide toward the stationary bed-piece, thereby compressing or upsetting the tire.

What I claim as my invention is—

The combination and arrangements of the sliding bed and stationary bed, stationary jaws and sliding jaws, wedge-shaped keys, cam, and lever, substantially as set forth and described, and for the purpose specified.

JOSEPH W. LAWSON.

In presence of—
    ED. P. PITKIN,
    T. D. TOOKER.